2,999,812
Patented Sept. 12, 1961

2,999,812
OIL WELL TREATING MATERIAL
Stanley Earl Krahler, Wilmington, Del., assignor to E. I. du Pont de Nemours and Company, Wilmington, Del., a corporation of Delaware
No Drawing. Filed Jan. 17, 1958, Ser. No. 709,466
6 Claims. (Cl. 252—8.55)

This invention relates to chemical products useful in treating oil wells. More specifically this invention is directed to products useful in removing flow restrictions from well bores and creating permeability, and methods of preparing such products.

In the drilling of oil wells and in repair of producing wells concentric shafts are sunk deep into the ground and the well drilled through the center of such shafts. In order to lubricate the drilling bit, special mud compositions are circulated through the central and outer shafts in such a way that the drilling bit is constantly surrounded by the mud composition. This effects cooling and increases the efficiency of the drilling operation. This mud, however, often clogs the spaces between the concentric pipes and other portions of the well and thereby prevents the flow of oil. Frequently, this clogging is due to the formation of thick water-crude oil emulsions which do not flow readily and act to block the flow of oil. In operating wells also, oil flow often stops due to numerous blocking materials which develop during normal operation. In order to enable blocked wells to continue production, compositions comprising aqueous mineral acid solutions containing a surfactant assistant have been developed, which, when introduced into the well, function to release the stoppage. The aqueous mineral acid solution of the surfactant serves to break up water-oil emulsions, creates permeability and permits the resumption of flow of the oil in the well. In addition, the surfactant acts to prevent further clogging.

It has been found that the combination of chemical ingredients disclosed below is particularly useful in treating oil wells, has the property of breaking oil and water emulsions and is suitable in this connection with modern drilling techniques. The combination of a mixture of aliphatic and cycloaliphatic hydrocarbons (or alkanes and cycloalkanes), sodium salts of mono- and disulfonic acids of the aforementioned hydrocarbons, isopropyl alcohol and water acts as an excellent surfactant and emulsion breaker and may be used in dilute aqueous mineral acid solutions. A small amount of sodium or other alkali metal chloride salt may be tolerated in the mixture. The salt content in the product to be added to mineral acid is preferably maintained below 5% by weight although 6% of the salt by weight apparently does not interfere with the activity of the product.

Proportions of the above ingredients are limited within the ranges disclosed herein. It is to be understood that this invention is limited to those combinations of ingredients falling within the scope of these ranges since amounts outside the ranges will not operate in the same advantageous manner as those well-treating products defined herein, although the alkali metal chloride salt content that may be tolerated appears to vary within the limits dictated by the amounts of additives used in the process steps. The amounts of additives are, of course, critical within relatively narrow limits.

It is an object of the present invention to provide a well-treating product which has excellent demulsifying properties for crude oil-water emulsions and has excellent surfactant properties.

It is another object of the present invention to provide a demulsifying and surfactant well-treating product which is soluble to the extent of at least 3% by weight in dilute hydrochloric acid solutions containing 7.5–15% by weight of HCl.

It is still another object of the present invention to provide a process for preparing this novel product.

Various well-treating compositions have been disclosed in the literature and patent art. Such compositions have been suitable in the past, but with the advent of modern drilling techniques and deeper well bores, it has been found that the known oil well-treating compositions are inadequate. It is desirable that the well-treating composition used be relatively soluble in dilute aqueous hydrochloric acid solutions containing 7.5–15% by weight of HCl and that the composition possess outstanding demulsifying and surfactant properties.

In carrying out the process for the preparation of the products of this invention, it is important to carefully select the petroleum hydrocarbons which are reacted with sulfur dioxide and chlorine. The petroleum hydrocarbons that may be used correspond to the commercially available No. 40 white oil. No. 40 white oil is a mixture of aliphatic and alicyclic branched chain hydrocarbons and the mixture has the following properties: Average molecular weight about 250, specific gravity at 15.5/15.5° C. not higher than 0.804, boiling range between about 285 and about 400° C. This oil is reacted with sulfur dioxide and chlorine in the presence of actinic light (in accordance with the process disclosed in Reed et al., U.S. Patent No. 2,370,421), at temperatures between 25 and 65° C. until the specific gravity at 30° C. of the mixture of alkanesulfonyl chlorides and unreacted oil is between 1.020 and 1.100. The specific gravity value is a means of controlling the composition of the reaction product. It should be emphasized that the specific gravity range of 1.020 and 1.100 as determined above is critical. This range is, of course, highly dependent on the ratio of the amount of mono- to disulfonyl chlorides which, in turn, determines the amounts of mono- and disulfonate when this mixture is hydrolyzed.

This chlorosulfonation process is well known in the art and is also described in U.S. Patent No. 2,197,800 to Henke and Lockwood.

The hydrocarbon sulfonyl chloride mixture is then hydrolyzed with an aqueous alkali metal hydroxide, preferably sodium hydroxide, to give a mixture of alkali metal alkane sulfonates, water and alkali metal chloride salt. In lieu of hydrolysis, solvolysis with methanol may be used. It is then necessary to eliminate the excess amount of the salt formed during the hydrolysis reaction and this is done by the addition of isopropyl alcohol and subsequent filtration. The concentration of salt in the final product should be below 6.0% by weight and any amount of salt above that amount is termed "excess"; the excess salt must be removed or the product will have insufficient solubility in HCl. The amount of isopropyl alcohol added will be between about 40 to 65% by weight of the sulfonic acid salts present in the hydrocarbon-sulfonyl mixture. The amount of sulfonyl chlorides in the chlorosulfonation mass is determined on the basis of weight gain.

The product must be liquid at room temperature and to that end removal of the excess salt, crystallized by the addition of the above specified amount of isopropanol to the hydrolysis reaction mixture, will reduce the salt content to the proper amount. Usually the remaining salt will comprise less than 5% by weight of the final product, but depending on the particular amounts of various components used within the ranges specified herein, in the process steps the salt content remaining in the final product can be 6% by weight or possibly slightly higher. It is to be understood, however, that the excess salt is crystallized by the addition of critical amounts of isopropanol and thereafter may be easily removed.

The excess salt must be removed; otherwise, the product is not liquid and it will become a thick pasty mass and crystalline salt mixture. Adding an amount of isopropanol less than the lower limit (40% by weight of the sulfonic acid salts) will yield this undesirable result.

The amount of isopropanol added to remove the excess salt must not exceed the upper limit of the above range (65% by weight of the sulfonic acid salts); otherwise, some of the end product itself will also be removed together with the excess salt and the demulsifying and surfactant activities of the product will be reduced. Thus the above range of isopropanol to be added is a critical one.

In actual use the composition product of this invention is dissolved in dilute hydrochloric acid having a hydrogen chloride content between 7.5 to 15% by weight and usually 10% by weight, to give a weight concentration of the treating agent of at least 3%. This solution is placed in the tubing in the well and displaced with available fluids into the formation leaving the perforated or open hole section just covered with the treating solution. After about 1 or 2 hours, natural flow of oil frequently occurs without further treament. Various methods of treatment of oil wells with the chemical mixture can be applied with the usual well-servicing tools.

Referring again to the process of preparing the well-treating product, the method involves the reaction of a mixture of aliphatic and cycloaliphatic hydrocarbons, found in No. 40 white oil, with sulfur dioxide and chlorine in the presence of actinic light. It will be appreciated that when the specific gravity of this mixture is between 1.020 and 1.100 at 30° C., there are formed amounts of alkanesulfonyl chlorides that may be converted to the sodium or other alkali metal mono- and disulfonates that fall within the ranges of 3 to 12 and 25 to 35 parts by weight of the final product layer, respectively, using sodium hydroxide in the hydrolysis step, when further processed as disclosed therein.

The alkanesulfonyl chlorides may be converted to the alkali metal salts by adding them to aqueous alkali metal hydroxide having sufficient strength to substantially convert all of alkanesulfonyl chlorides to mono- and disulfonates and in a sufficient amount of water so as to comprise between 12 to about 40 parts by weight of the lower product layer formed after the addition of isopropyl alcohol. The amount of isopropyl alcohol added is also critical and must be between 40 to 65% by weight of the converted salts.

It is to be further understood that to be soluble to the extent of 3% by weight in 7.5 to 15% hydrochloric acid, the product layer must contain the following ingredients in the parts by weight ranges recited:

| | |
|---|---|
| Sodium alkane monosulfonates | 3–12. |
| Sodium alkane disulfonates | 25–35. |
| Dispersed oil | 6–12. |
| Isopropanol | 17–24. |
| Salt (NaCl) | 0–about 6. |
| Water | Balance to make 100 parts total. |

Other alkali metals may be used instead of sodium.

As noted above, these ranges are critical and well-treating products must contain the active ingredients in amounts within these ranges to be at least 3% by weight soluble in dilute hydrochloric acid.

The amount of the well-treating product to be used depends upon the thickness and porosity of the formation and a number of conditions existing in the field which makes it difficult to exactly specify how much to use in each case. Generally, however, it has been found that 500 to 1,000 gallons of the hydrochloric acid solution is sufficient to be effective.

The following examples will assist in the understanding of the present invention:

*Example I*

Eight hundred parts of a commercial 40 S.U.S. (Saybolt Universal seconds at 100° F.) viscosity white oil (a mixture of aliphatic and cycloaliphatic hydrocarbons having an average molecular weight about 250, a specific gravity of 0.796 at 40° C., and a boiling range between 285 to 410° C.) was reacted at 25 to 30° C. with a mixture of sulfur dioxide and chlorine (approximately 2:1 by weight) in the presence of a photoflood lamp. After about 600 parts of sulfur dioxide and 300 parts of chlorine had been added, the crude mixture of sulfonyl chlorides (1140 parts) had a specific gravity of 1.020 at 30° C. The crude sulfonyl chloride was swept with nitrogen to remove dissolved chlorine, sulfur dioxide and hydrogen chloride and the mass was hydrolyzed at 85 to 110° C. by slow addition to a mixture of 830 parts of 30% aqueous sodium hydroxide and 100 parts of sodium chloride (the salt being added to facilitate a later layer separation). The hydrolysis mass was held for 1 hour at 90 to 100° C. and a pH of 8 to 10 to complete the conversion of the alkanesulfonyl chlorides to the corresponding sodium sulfonates.

The charge was cooled to 30 to 35° C. and allowed to separate into layers; the bottom (brine-rich) layer was removed from the upper (oil-rich layer). The bottom layer was heated to 60° C. and treated with 500 parts of isopropanol. On cooling, salt crystallized from the mixture; the salt was removed by filtration at 30 to 35° C. The filtrate from the lower layer-isopropanol mixture was added with agitation to the upper layer in order to mix thoroughly. On standing without agitation, separation to a lower (product) layer and an upper (unreacted oil) layer occurred; the product layer was separated from the undispersed oil layer to give 2184 parts of product. Analysis showed the product to have the following composition:

| | Percent by weight |
|---|---|
| Sodium alkane monosulfonates | 11.6 |
| Sodium alkane disulfonates | 25.7 |
| Dispersed oil | 10.6 |
| Sodium chloride | 3.6 |
| Isopropanol | 21.7 |
| Water | 26.8 |

The product was soluble at the 3% level in 7.5% hydrochloric acid and had an excellent demulsifying action on crude oil-water and crude oil-aqueous acid emulsions. Field evaluation of the agent showed it to be very effective in relieving a blocked oil well.

*Example II*

Eight hundred parts of commercial 40 S.U.S. viscosity white oil was treated at 55–60° C. with sulfur dioxide and chlorine as in Example I. The crude sulfonyl chloride mixture (1150 parts; specific gravity of 1.020 at 30° C.) was hydrolyzed as in Example I with 776 parts of 30% sodium hydroxide. After the mass had been agitated for 1 hour at 90–100° C. and a pH of 8–10, the charge was cooled at 60° C. and 500 grams of isopropanol added. Salt crystallized immediately and was filtered from the product solution at 30° C. The product solution was adjusted in total sodium alkanesulfonate content from 40.1% to 37.8% by addition of 182 parts of water. An upper (undispersed) oil layer was removed from the product layer, 2272 parts of product was isolated. The surfactant solution had the following composition:

| | Percent |
|---|---|
| Sodium alkane monosulfonates | 7.1 |
| Sodium alkane disulfonates | 30.7 |
| Dispersed oil | 9.7 |
| Sodium chloride | 2.4 |
| Isopropanol | 20.9 |
| Water | 29.2 |

The product had the same acid solibility and demulsifying action as that of Example I.

Example III

Four hundred parts of a commercial 40 S.U.S. viscosity white oil was treated at 25-30° C. with sulfur dioxide and chlorine (approximately 2:1 ratio by weight) in the presene of a General Electric Photoflood lamp. After 325 parts of sulfur dioxide and 170 parts of chlorine had been added, the specific gravity of the crude mixture of alkanesulfonyl chlorides was 1.005 at 30° C.; 604 parts of crude sulfonyl chloride was produced. The crude sulfonyl chloride mixture was converted into the corresponding mixture of sodium alkanesulfonates by hydrolysis at 90-100° C. with 509 parts of 30% aqueous sodium hydroxide solution. After one hour longer at 90-100° C. and a pH of 8-10, the hydrolyzed mass was cooled to 40° C. The mixture separated into two layers as in Example I; the lower (brine layer) was removed and treated at 60-65° C. with 250 parts of isopropanol. The salt which crystallized was filtered at 30° C. and the filtrate was added to the upper (oil-rich) layer. After thorough agitation and a holding period without agitation removal of the product (bottom) layer from a small oil layer gave 1198 parts of surfactant solution, having the following composition:

| | Percent |
|---|---|
| Sodium alkane monosulfonates | 9.3 |
| Sodium alkane disulfonates | 29.0 |
| Dispersed oil | 7.1 |
| Sodium chloride | 4.0 |
| Isoropanpol | 19.5 |
| Water | 31.1 |

The product formed a clear, homogeneous 3% solution in 10% hydrochloric acid. The surfactant showed excellent demulsifying action on emulsions of crude oil and dilute hydrochloric acid.

Example IV

Eight hundred parts of commercial 40 S.U.S. viscosity white oil was treated with sulfur dioxide and chlorine (2:1 ratio) at 55-60° C. in presence of a General Electric Photoflood lamp. Gassing was continued until the mixture of sulfonyl chlorides showed a specific gravity at 30° C. of 1.100; after sweeping dissolved sulfur dioxide, chlorine and hydrogen chloride from the crude sulfonyl chloride, a total of 1276 parts of material was obtained. The crude sulfonyl chloride was hydrolyzed at 90-100° C. with 1150 parts of 30% aqueous sodium hydroxide solution. The mixture was held for one hour at 90-100° C. and a pH of 8-10 to guarantee completion of the hydrolysis; it was then cooled to 60° C. and treated with 500 parts of isopropanol. The mixture was filtered free of crystalline salt at 30-35° C. The filtrate (2640 parts) was diluted with water to adjust the sodium alkanesulfonate content from 40% to 36.9% and was separated from a small amount of oil. The product solution had the following anaylsis:

| | Percent |
|---|---|
| Sodium alkane monosulfonates | 3.3 |
| Sodium alkane disulfonates | 33.6 |
| Dispersed oil | 6.0 |
| Sodium chloride | 5.0 |
| Isopropanol | 17.0 |
| Water | 35.1 |

The product gives a clear, homogeneous 3% solution in 10% hydrochloric acid and is readily dispersible in 15% hydrochloric acid at the 3% level. It shows good demulsifying action on crude oil-acid emulsions.

Using an equimolar amount of aqueous potassium hydroxide instead of sodium hydroxide solution, a product is obtained that for all practical purposes is identical to the product prepared using sodium hydroxide solution and is an excellent well-treating product.

Example V

Twelve hundred parts of commercial 40 S.U.S. viscosity white oil was treated with sulfur dioxide and chlorine in Example I. The gassing was terminated when the crude sulfonyl chloride mixture reached a specific gravity of 30° C. of 0.986; 1652 parts of crude sulfonyl chloride was obtained. Hydrolysis of 200 parts of the crude alkanesulfonyl chloride was effected at 90-100° C. by addition to 120 parts of 30% aqueous sodium hydroxide solution. The mixture of sodium alkanesulfonates was held at 90-100° C. and a pH of 8-10 for 1 hour longer. The mixture was cooled to 20° C., at which point it formed a thick, pasty mass. After addition of 80 parts of isopropanol and agitation of the mixture, the pasty mass thinned and salt crystals separated. The salt was removed by filtration at 10° C. and an upper (undispersed) oil layer removed at 20-25° C., leaving 353 parts of product as a solution.

While the product was equal to that described in Example I as an oil-dilute acid demulsifying agent, it was not completely soluble at the 3% level in 7.5% hydrochloric acid. This decreased solubility is a reflection of the low specific gravity of alkanesulfonyl chlorides.

Example VI

Eight hundred parts of a commercial 30 S.U.S. viscosity while oil (a mixture of aliphatic and cycloaliphatic hydrocarbons having a specific gravity of 0.770 at 40° C. and a boiling range of 200-260° C.) was reacted at 55-60° C. with a mixture of sulfur dioxide and chlorine (approximately 2:1 by weight) in the presence of a General Electric Photoflood lamp. The gassing was continued until the weight increase (360 parts) approximated the weight increase for a commercial 40 S.U.S. viscosity oil (Example I); the specific gravity of the mixture of alkanesulfonyl chlorides was 1.005 at 30° C. The crude sulfonyl chloride was swept with nitrogen to remove dissolved chlorine, sulfur dioxide and hydrogen chloride and was hydrolyzed by slow addition at 70-110° C. to 893 parts of 30% aqueous sodium hydroxide solution. The mixture of sodium alkanesulfonates was held at 90-100° C. and a pH of 8-10 for 1 hour longer; the mixture was then cooled to 60° C. and was treated with 500 parts of isopropanol. The salt which crystallized was removed by filtration after cooling to 30° C., leaving 2230 parts of product.

The product was essentially equal as a demulsifying agent for crude oil-dilute acid mixtures to that described in Example I, but was not soluble at the 3% level in 7.5% hydrochloric acid.

As stated before, in the preparation of the product, the excess salt must be removed by the addition of the proper amount of isopropanol to the sulfonic acid salt mixture. The addition of too much isopropanol to this mixture removes some of the product and impairs the demulsifying and surfactant properties of the final product. Similarly, if a product is prepared that does not possess the essential solubility in hydrochloric acid as noted in Example VI, the product would be unacceptable for use in treating oil wells by modern standards.

I claim:

1. An acid soluble surface-active composition consisting of 6 to 12 parts by weight of a mixture of aliphatic and cycloaliphatic hydrocarbons having an average molecular weight of about 250 and a boiling range of from about 285° to about 410° C., 3 to 12 parts by weight of the alkali metal salts of monosulfonic acids of said mixture and 25 to 35 parts by weight of the alkali metal salts of disulfonic acids of said mixture, 0 to about 6 parts by weight of sodium chloride, 17 to 24 parts by weight of isopropyl alcohol and the remainder of 100 parts by weight being water.

2. An acid soluble surface-active composition consisting of 10.6 parts by weight of a mixture of aliphatic and cycloaliphatic hydrocarbons having an average molecular weight of about 250 and a boiling range of from about 285° to about 410° C., 11.6 parts by weight of the sodium salts of monosulfonic acids of said mixture and 25.7 parts by weight of the sodium salts of disulfonic acids of said mixture, 3.6 parts by weight of sodium chloride, 21.7 parts by weight of isopropyl alcohol and 26.8 parts by weight of water.

3. An acid soluble surface-active composition consisting of 9.7 parts by weight of a mixture of aliphatic and cycloaliphatic hydrocarbons having an average molecular weight of about 250 and a boiling range of from about 285° to about 410° C., 7.1 parts by weight of the sodium salts of monosulfonic acids of said mixture and 30.7 parts by weight of the sodium salts of disulfonic acids of said mixture, 2.4 parts by weight of sodium chloride, 20.9 parts by weight of isopropyl alcohol and 29.2 parts by weight of water.

4. An acid soluble surface-active composition consisting of 7.1 parts by weight of a mixture of aliphatic and cycloaliphatic hydrocarbons having an average molecular weight of about 250 and a boiling range of from about 285° to about 410° C., 9.3 parts by weight of the sodium salts of monosulfonic acids of said mixture and 29.0 parts by weight of the sodium salts of disulfonic acids of said mixture, 4.0 parts by weight of sodium chloride, 19.5 parts by weight of isopropyl alcohol and 31.1 parts by weight of water.

5. The process of producing a chemical inter-mixture product that is at least 3% by weight soluble in 7.5 to 15% hydrochloric acid, comprising the steps of reacting a mixture of aliphatic and cycloaliphatic hydrocarbons having a S.U.S. viscosity of 40, a specic gravity of about 0.796 at 40° C., an average molecular weight of about 250 and a boiling range of from about 285° to about 410° C. with a gaseous mixture of chlorine and sulfur dioxide in the presence of actinic light until there is obtained a mixture of hydrocarbon sulfonyl chlorides and unreacted hydrocarbons having a specific gravity between 1.020 and 1.100 at 30° C., adding the mixture of sulfonyl chlorides to aqueous alkali metal hydroxide to convert the hydrocarbon sulfonyl chlorides to hydrocarbon sulfonate alkali metal salts, adding isopropanol in an amount equal to between 40% and 65% by weight of the sulfonate salts, filtering out the crystallized alkali metal chloride, permitting the reaction admixture to form two layers and thereafter separating the lower product layer from the upper layer.

6. An acid soluble surface-active composition consisting of 6.0 parts by weight of a mixture of aliphatic and cycloaliphatic hydrocarbons having an average molecular weight of about 250 and a boiling range of from about 285° C. to about 410° C., 3.3 parts by weight of the sodium salts of monosulfonic acids of said mixture and 33.6 parts by weight of the sodium salts of disulfonic acids of said mixture, 5.0 parts by weight of sodium chloride, 17.0 parts by weight of isopropyl alcohol and 35.1 parts by weight of water.

References Cited in the file of this patent

UNITED STATES PATENTS

| | | |
|---|---|---|
| 1,823,439 | De Groote | Sept. 15, 1931 |
| 2,174,507 | Tinker et al. | Sept. 26, 1939 |
| 2,197,800 | Henke et al. | Apr. 23, 1940 |
| 2,285,337 | Kapp et al. | June 2, 1942 |
| 2,328,931 | Steik | Sept. 7, 1943 |
| 2,370,421 | Reed | Feb. 27, 9145 |
| 2,808,109 | Kirk | Oct. 1, 1957 |
| 2,833,711 | Arnold | May 6, 1958 |

UNITED STATES PATENT OFFICE
CERTIFICATE OF CORRECTION

Patent No. 2,999,812                                           September 12, 1961

Stanley Earl Krahler

It is hereby certified that error appears in the above numbered patent requiring correction and that the said Letters Patent should read as corrected below.

Column 3, line 37, for "therein" read -- herein --; column 5, line 8, for "1.005" read -- 1.055 --; column 7, line 30, for "specic" read -- specific --; column 8, lines 7 and 8, for "isopropropanol" read -- isopropanol --; line 31, for "Feb. 27, 9145" read -- Feb. 27, 1945 --.

Signed and sealed this 13th day of February 1962.

(SEAL)
Attest:

ERNEST W. SWIDER
Attesting Officer

DAVID L. LADD
Commissioner of Patents